United States Patent [19]

Shahid

[11] Patent Number: 5,689,599

[45] Date of Patent: Nov. 18, 1997

[54] OPTICAL FIBER CONNECTOR WITH ENHANCED BONDING

[75] Inventor: Muhammed A. Shahid, Ewing Township, N.J.

[73] Assignee: Lucent Technologies, Inc., Murray Hill, N.J.

[21] Appl. No.: 632,255

[22] Filed: Apr. 15, 1996

Related U.S. Application Data

[63] Continuation of Ser. No. 290,272, Aug. 15, 1994, Pat. No. 5,519,798.

[51] Int. Cl.$^6$ .................................................. G02B 6/36
[52] U.S. Cl. .................. 385/83; 385/65; 385/59; 385/71; 385/51
[58] Field of Search .............................. 385/83, 85, 59, 385/71, 75, 76, 88, 51, 65

[56] References Cited

U.S. PATENT DOCUMENTS

| 5,082,346 | 1/1992 | Myers | 385/51 |
| 5,519,798 | 5/1996 | Shahid et al. | 385/83 X |

*Primary Examiner*—Phan T. H. Palmer

[57] ABSTRACT

An improved fiber optic connector for supporting therebetween an array of optical fibers, the connector comprising first and second support members, each having on a first surface thereof a parallel array of grooves and at least one side landing section. The side landing section of the support member is substantially planar and has a substantially irregular surface thereon for enhancement of bonding between the support members. The grooves of the first and second support members are adapted to contain therebetween the array of optical fibers. The irregular surfaces of the side landing sections of the first and second support members are juxtaposed to substantially overlap each other when the first and second support members are placed in mating relationship around the array of optical fibers. The irregular surfaces of the side landings are joined together around the array of optical fibers with an adhesive epoxy.

15 Claims, 4 Drawing Sheets

OPTICAL FIBER CONNECTOR WITH ENHANCED BONDING

This is a continuation of U.S. application Ser. No. 08/290,272 filed Aug. 15, 1994 now U.S. Pat. No. 5,519,798.

FIELD OF THE INVENTION

This invention relates to interconnections for optical fibers and, more particularly, to an improved optical fiber connector having enhanced bonding between its constituent support members.

BACKGROUND OF THE INVENTION

In the field of optical fiber interconnects, there is a continuous desire to employ fiber interconnection systems and methods that lead to more accurate and expedient connections between fiber optics. For example, the U.S. Pat. No. 5,268,981, granted Dec. 7, 1993 (hereinafter the '981 patent) and incorporated herein by reference, describes a method for applying optical fiber connectors to optical backplanes of the type comprising optical fibers routed on a flexible plastic substrate. The optical fiber connectors include output tabs or output ports. The optical fibers at each of the output tabs or output ports are contained between a pair of optical fiber support members on opposite sides of the fibers. The support members are made of a monocrystalline material, such as silicon, in which opposing V-grooves are made by photolithographic masking and etching for containing the fibers. It is essential that the optical fibers be contained at precise locations by the support members of a connector so that the optical fibers of another connector can be abutted against them such that light can be efficiently transmitted between the abutted fibers. Monocrystalline silicon support members suit this purpose because of the precision with which the V-grooves in such materials can be made. U.S. Pat. No. 5,287,426, granted Feb. 15, 1994 (hereinafter the '426 patent) and incorporated herein by reference, describes how the same general technique can be used for applying connectors to optical fiber ribbons.

While the techniques of the '981 patent and the '426 patent have significantly reduced the time, expense and operator skill needed to provide interconnections to the output ports of optical backplanes and to optical fiber ribbons, forming and applying the connectors still constitutes a significant expense. Furthermore, the silicon connectors are not amenable to automatic or robotic placement, as is desirable for mass production, because of their relative fragility and the difficulty of shaping them along planes that do not correspond to their crystallographic planes. Making V-grooves in each individual support member by photolithographic masking and etching is, of itself, comparatively time consuming.

An improved optical fiber connector and connecting techniques are disclosed in U.S. Pat. No. 5,388,174 (hereinafter the '174 patent) and incorporated herein by reference. The improved connector of the '174 patent comprises a first optical fiber support member held in a first fixture having a first alignment pin extending therefrom perpendicularly to an optical fiber array and also having a first alignment aperture. A second support member is held in a second fixture having a second alignment aperture and a second alignment pin extending therefrom perpendicularly to the optical fiber array. When the two support members are clamped on opposite sides of the optical fiber array, they are aligned by engaging the first alignment pin with the second alignment aperture and engaging the second alignment pin with the first alignment aperture. With the support members clamped, fluid adhesive is applied through an aperture to bond the support members and optical fiber array together. The first and second support members are made of plastic and are made by a molding technique, such as plastic molding. As a consequence, a third alignment projection and a third alignment aperture can be made in the first support member, and a fourth alignment projection and a fourth alignment aperture can be made in the opposing face of the second support member. These projections are much smaller than the first and second alignment pins, and when the support members are clamped together, engagement of the third alignment projection with the fourth alignment aperture and engagement of the fourth alignment projection with the third alignment aperture gives a finer and more precise degree of alignment.

While the connectors and connecting techniques taught by the above references provide improvements in fiber-optic interconnection, there is still a need for an optical fiber connector that provides a substantially strong bonding between fibers and the supporting members of the connector.

SUMMARY OF THE INVENTION

The present invention is an improved fiber optic connector for supporting therebetween an array of optical fibers, the connector comprising first and second support members, each having on a first surface thereof a parallel array of grooves and at least one side landing section. The side landing section of the support member is substantially planar and has a substantially irregular surface thereon for enhancement of bonding between the support members. The grooves of the first and second support members are adapted to contain therebetween the array of optical fibers. The irregular surfaces of the side landing sections of the first and second support members are juxtaposed to substantially overlap each other when the first and second support members are placed in mating relationship around the array of optical fibers. The irregular surfaces of the side landings are joined together around the array of optical fibers with an adhesive epoxy.

Each support member is made by making an array of V-grooves and side landings in monocrystalline material by photolithographic masking and etching. By way of the present invention, the side landings are provided with a substantially irregular surface by providing a mask layer having a window opening located substantially over each side landing so as to leave only the side landings exposed; and then by roughening the exposed side landing surfaces to obtain an irregular surface thereon. Metal is then deposited on the array of V-grooves and side landings, the monocrystalline material is removed, and the deposited metal is then used as a mold portion for making a plastic support member by molding.

The exposed side landing surfaces of the support members are roughened in order to obtain an irregular surface thereon by techniques known in the art such as isotropic etching or sandblasting.

BRIEF DESCRIPTION OF THE DRAWING

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE PREFERRED EMBODIMENT

Figure 1:
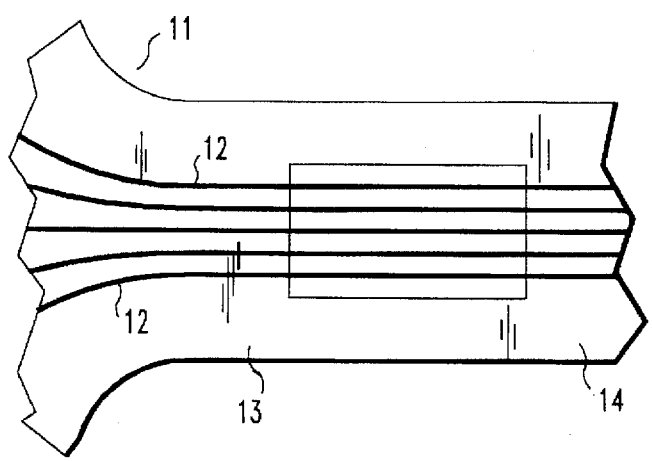
FIG. 1 is a prior art diagram of a schematic view of part of an optical backplane to which a connector is to be applied.
Figure 2:
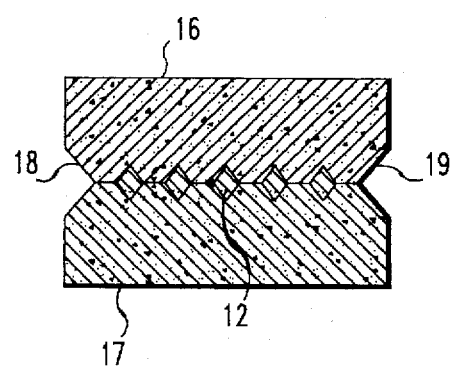
FIG. 2 is a prior art diagram of a schematic view of a connector that can be used for containing the optical fibers of FIG. 1.

In order to describe the preferred embodiment of the present invention, which utilizes opposing support members with irregularly surfaced side landings to enhance bonding between the constituent support members, it is instructive to first describe the prior art fiber optic connector and interconnecting techniques as disclosed in the '174 patent, which is incorporated by reference herein. As shown in the '174 patent, and referring now to FIG. 1, there is shown an output port of an optical backplane comprising a flexible plastic substrate 11 upon which have been adhered a plurality of optical fibers 12. An aperture has been made in the substrate 11 such that the optical fibers extend across the aperture between opposite substrate segments 13 and 14. In accordance with the aforementioned '981 patent, connectors can be applied to the output port of FIG. 1 by applying, on opposite sides of the optical fibers 12, first and second optical fiber support members 16 and 17, as shown in FIG. 2. It is noted that in accordance to the present invention, the connectors discussed herein may be used to connect not only fiber optics, but other optical devices such as planar waveguides, optical sources and optical detectors. Therefore, in this context, all discussion related to fiber optics also apply to such other optical devices.

Figure 3:
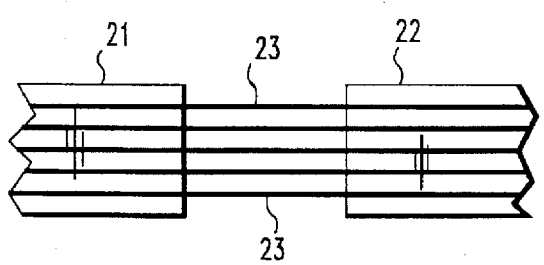
FIG. 3 is a prior art diagram of a schematic view of part of an optical fiber ribbon to which a connector is to be applied.

Support members 16 and 17 are conventionally made of a monocrystalline material, such as silicon, into which opposing V-grooves can be made with precision by photolithographic masking and etching. Etching of the material inherently progresses along crystallographic planes, which permits features to be formed with precise predictability. Support members 16 and 17 are also shown as having alignment grooves 18 and 19 on the sides thereof, which permit the mounting of alignment pins with a spring clip, as is described in Bonanni, U.S. Pat. No. 4,818,058, granted Apr. 4, 1989 (the '058 patent), incorporated by reference herein (see especially FIGS. 2 and 4 thereof). After the assembly shown in FIG. 2, the support members 16 and 17 and the optical fibers 12 may be severed by cutting transversely to the optical fibers, as described in the '981 patent, to provide a connector surface that can be subsequently connected or abutted to a similar or compatible connector surface of another connector for optical fiber interconnection. The aforementioned '426 patent describes how this technique can be applied to optical fiber ribbons, as shown in FIG. 3, in which an optical fiber ribbon comprises two displaced substrate portions 21 and 22 which are bridged by optical fibers 23 that adhere to the substrate portions 21 and 22.

The '174 patent provides for machine placement of opposite optical fiber support elements of the type shown in FIG. 2. Machine placement of the support members is greatly facilitated by making them of plastic, rather than silicon. In particular, injection molding is used to make the opposite segments, which is a much less expensive process than masking and etching, and allows the formation of structural features such as angle steps needed for precise alignment and placement.

Figure 4:
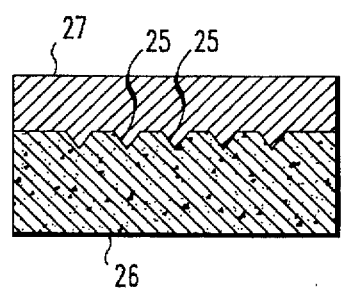
FIG. 4 is a prior art diagram of a schematic view of apparatus for making a plastic mold for making optical fiber connectors.
Figure 5:
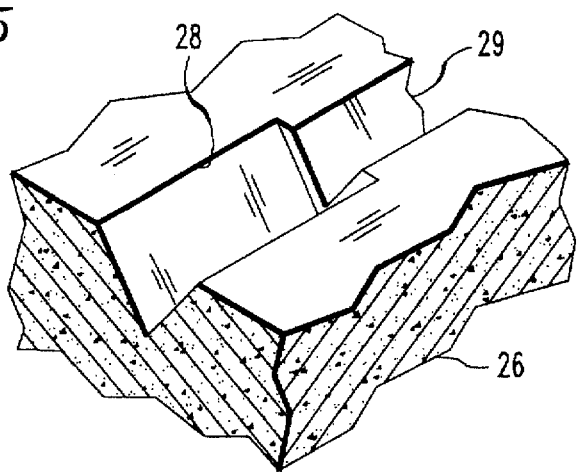
FIG. 5 is a prior art diagram of a perspective view of part of a V-groove of an optical fiber connector.

As illustrated in FIG. 4, the first step in this procedure is to make an array of V-grooves 25 in a monocrystalline body 26 such as silicon, by the conventional masking and etching process. This defines the V-grooves with the requisite precision. However, to allow for shrinkage of the plastic during the subsequent molding process, the V-grooves should be made somewhat larger than is finally intended for the final optical fiber support. A metal layer 27 is then electroformed over the V-grooves; thereafter, the silicon body 26 is removed or destroyed, as by etching it in, for example, a mixture of HF, HNO3 and water, or KOH and water (other known etchants of silicon could alternatively be used). The metal layer 27 is then used as an insert in a mold which defines the remaining configuration of the support members. That is, fiber support members are made by injection molding, using a mold having the metal layer insert in the portion of the mold defining the V-grooves of the support members being made.

Figure 10:
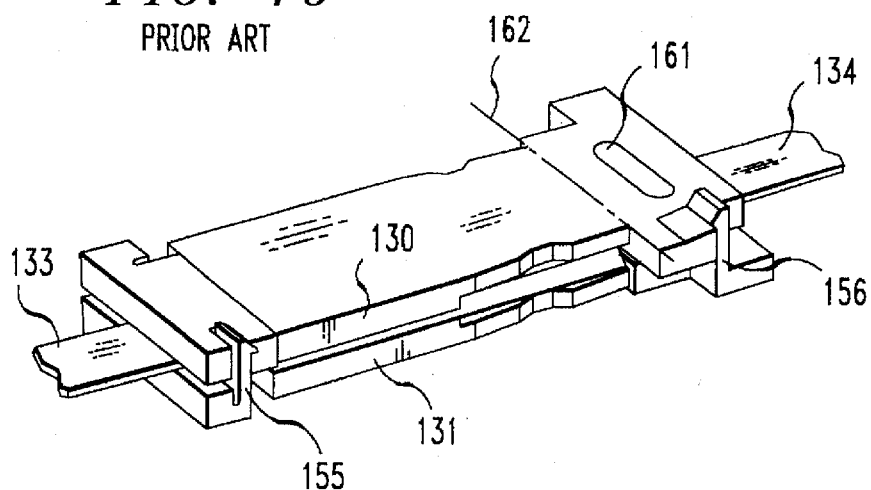
FIG. 10 is a perspective schematic view of an assembled prior art optical fiber connector.
Figure 11:
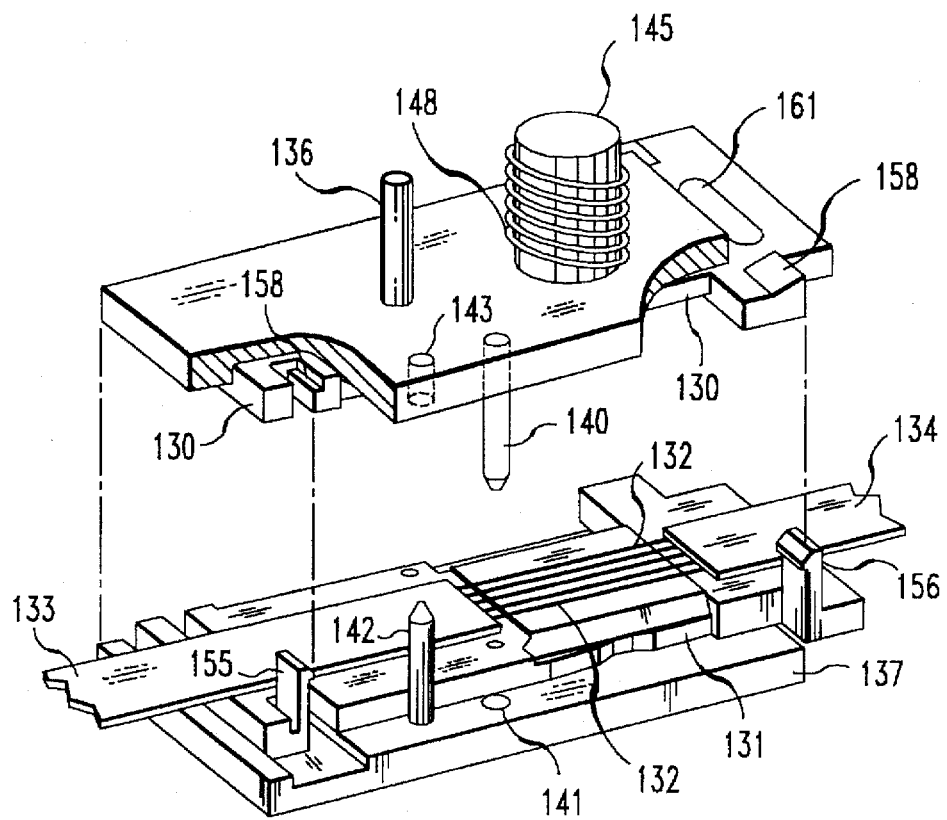
FIG. 11 is a schematic view of a prior art apparatus for applying connectors to an optical fiber ribbon.

Reference should be made to the '174 patent for a full description of the specific process by which the support members are joined around the array of optical fibers. As further described therein, after the supporting members have been mechanically joined via the mounting fixture, FIG. 10 (FIG. 9 therein) shows the completed assembly comprising the two support members 130 and 131 on opposite sides of the optical fibers extending between optical fiber ribbon segments 133 and 134. Latches 155 and 156 hold the assembly together with each of the optical fibers 132 contained within matching pairs of V-grooves, as shown in FIG. 7 therein. The upper support member 130 contains an opening 161 into which liquid adhesive may be applied. With the adhesive being of a proper viscosity, it contacts the optical fibers 132 shown in FIG. 11 (FIG. 6 therein) and propagates by capillary action along the optical fibers 132. The adhesive also travels by capillary action along the tiny space between the support members 130 and 131. Thereafter, the adhesive is allowed to cure and bond together support members 130 and 131 and optical fibers 132; it should be noted that during this period the assembly has been removed from the machine apparatus, thus enabling the apparatus to be used for other purposes.

After the adhesive has cured, the bonded support members 130 and 131 and the intervening optical fibers are cut along a vertical plane, in the manner described in the '981 patent. The latch 156 is therefore cut away from the remaining assembly, but it is no longer needed because the support members and optical fibers have been bonded by the adhesive. The exposed ends of the optical fibers are then polished, and an alignment clip is placed around the assembly, as shown in FIG. 4 of the Bonanni patent. The clip holds alignment pins pressed against opposite sides of the support members 130 and 131. One alignment pin is pressed against a V-groove and the other pin against an opposite V-groove. The alignment pins pressed against the V-grooves then allow the assembly to be used as a connector, that is, to be mated to an abutting connector for allowing transmission of light energy from the optical fibers of one connector to the optical fibers of the mating connector.

While electroforming has been described for depositing metal layer 27 of FIG. 4, other deposition methods such as vapor deposition could alternatively be used. Molding processes other than injection molding, such as transfer molding, can be used for making support members 30 and 31. Clamping arrangements other than latches 55 and 56 could alternatively be used. The adhesive can be applied before the support members 30 and 31 are pressed together, if desired.

Figure 6:
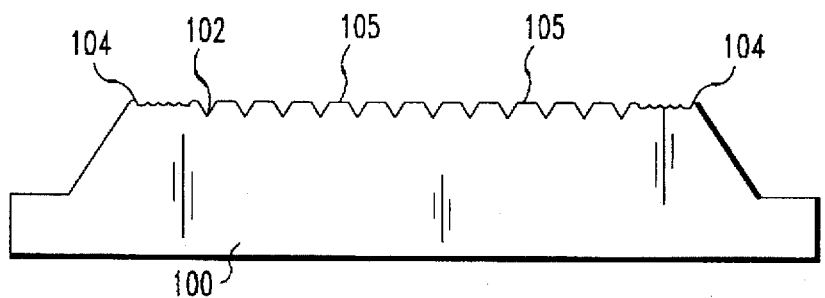
FIG. 6 is a schematic view of a support member of a fiber optic connector with irregular surfaced side landings in accordance with the present invention.
Figure 7:
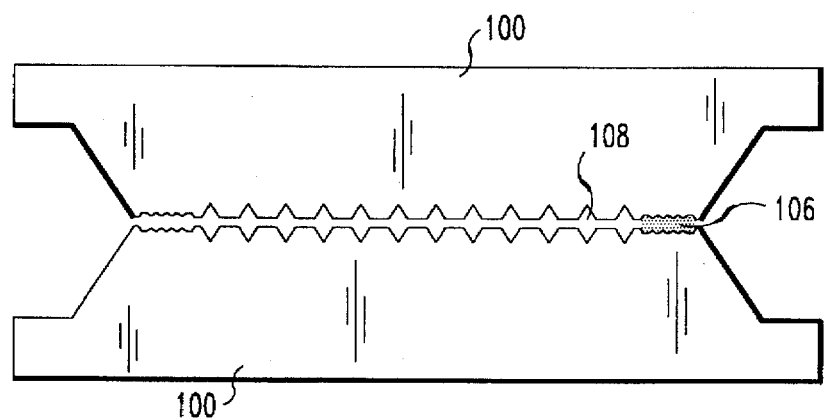
FIG. 7 is a schematic view of a fiber optic connector formed from a pair of support members of FIG. 6.
Figure 8:
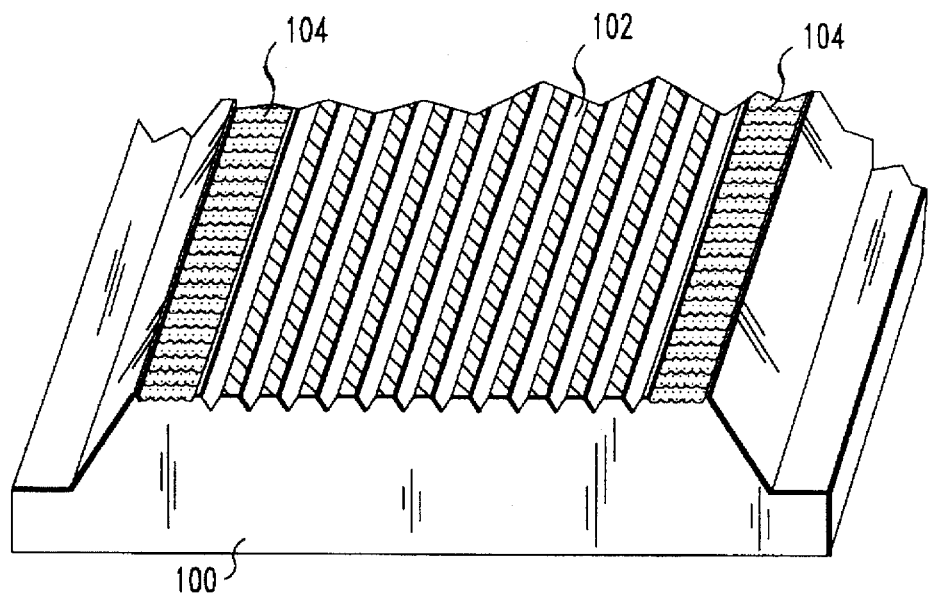
FIG. 8 is a cutaway perspective view of a support member with irregular surfaced side landings in accordance with the present invention.

The improvement of the present invention is now described with particular reference to FIGS. 6 and 7. A support member 100, which is similar to the prior art support member 16, 17 shown in FIG. 2, comprises V-grooves 102 formed with precision by photolithographic masking and etching. The support member 100 comprises a pair of side landings 104, which are situated in parallel with the V-grooves 102 and which extend along the length of the support member as shown in FIG. 8. When opposing support members 100 are placed in facing relationship around an array of optical fibers and provided with a bonding agent such as an adhesive epoxy as described above, the effect of the irregular surface area is to increase substantially the bonding between the side landings 104 at the joint 106 and thus between the support members and the fiber optic array. As a result of the substantially enhanced bond, the efficacy and reliability of the connector formed thereby is increased.

The amount of side landing surface area which is provided with an irregular surface via the techniques to be described below may vary in accordance with the manufacturing parameters and conditions which may be required; but suffice it to say that an increase in the relative percentage of irregular surface area will result in an increase in the bonding strength between the support members 100 forming the connector. Furthermore, in accordance with another embodiment of the invention, one or more of remaining side landings 105 adjacent to each V-groove 102 may also be configured to have an irregular surface.

The side landings 104 may be provided with an irregular surface area by any suitable technique known in the art. For example, during fabrication of a monocrystalline support member 100 by photolithographic masking and etching, an additional mask layer or layers are provided with a window opening located over the side landing area to be toughened such that only that side landing area is exposed to further processing. The exposed side landings are then roughened by a suitable technique such as isotropic etching or by a precisely controlled sandblasting technique well known in the art. As a result of such processing, the side landings 104 are provided with a roughened or irregular surface area which is used to enhance the bonding when used to fabricate a fiber optic connector as described herein.

As with the prior art support members described herein, a support member 100 may be made from a monocrystalline material such as silicon and then used as a master to form an inverse mold similar to that shown in FIG. 4, which is suitable for use in producing plastic support members. The irregular surface of the side landings 104 are reproduced in inverse in the metal deposited thereon, and are then reproduced in positive when a plastic support member is fabricated therefrom.

Figure 9:
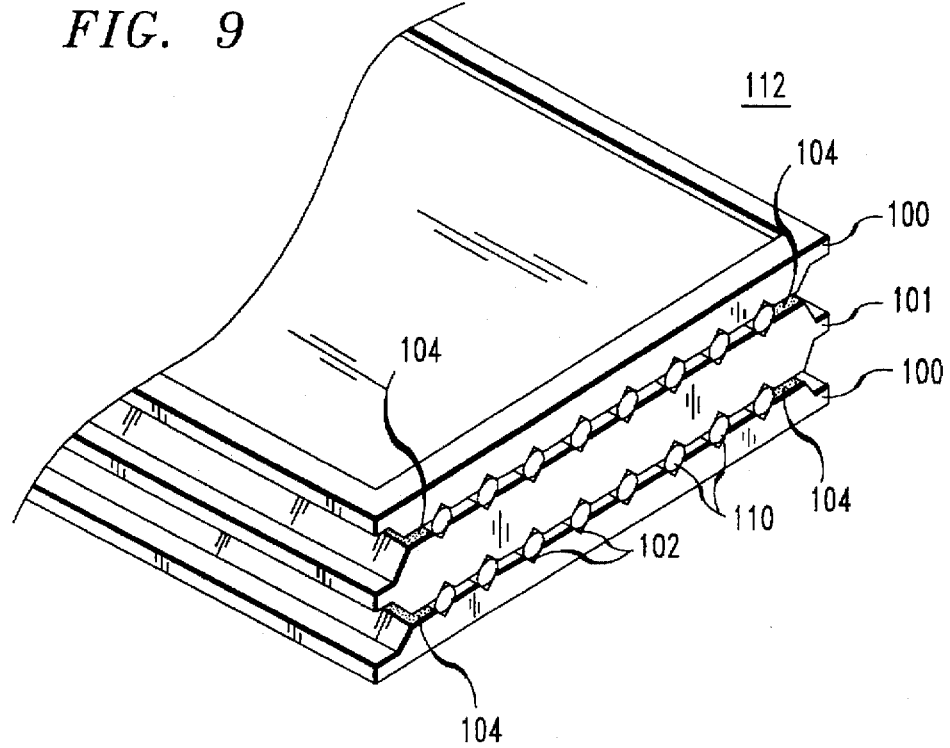
FIG. 9 is a cutaway perspective view of an alternative two-dimensional embodiment of the present invention.

Various other embodiments and modifications may be made by those skilled in the art without departing from the spirit and scope of the invention. For example, an alternative embodiment is illustrated in FIG. 9, which shows a two-dimensional fiber optic array connector 112 comprising two outer support members 100 and a two sided inner support member 101. The two sided inner support member 101 is configured with parallel V-grooves and roughened side landings 104 on each of its opposing surfaces such that a pair of outer support members 100 form a two layered fiber optic connector with enhanced bonding between the support members 100, 101 as shown.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

I claim:

1. A connector for supporting therebetween an array of optical devices that carry optical signals, said connector comprising:

first and second support members each having on a first surface thereof a parallel array of grooves and at least one side landing section, the side landing section being substantially planar and having a substantially irregular surface thereon, wherein the first and second support members are substantially entirely of plastic and are made by plastic molding;

the grooves of the first and second support members adapted to contain therebetween an array of optical fibers; and the irregular surfaces of the side landing sections of the first and second support members juxtaposed to substantially overlap each other when the first and second support members are placed in mating relationship around the array of optical fibers.

2. The connector of claim 1 wherein said optical device are optical fibers.

3. The connector of claim 2 wherein the irregular surfaces of the side landings are joined together around the array of optical fibers with an adhesive epoxy.

4. A method for applying a connector to a parallel array of optical fibers that are adhered to first and second displaced substrate portions and which extend between the displaced substrate portions; comprising the steps of:

providing first and second optical fiber support members having on opposing and mating surfaces thereof a substantially planar side landing section having a substantially irregular surface suitable for enhancing the bonding therebetween, containing the array of optical fibers between the first and second optical fiber support members on opposite sides of the array, wherein the first and second support members are substantially entirely of plastic and are made by plastic molding, applying fluid adhesive between the first and second support members and to the optical fibers and clamping together the first and second support members as the adhesive cures, and cutting transversely through the first and second support members and the optical fiber array.

5. A connector for supporting therebetween an array of optical devices that carry optical signals, said connector comprising:

first and second support members each having on a first surface thereof a parallel array of grooves and at least one side landing section, the side landing section being substantially planar and having a substantially irregular surface thereon;

the grooves of the first and second support members adapted to contain therebetween an array of optical fibers; and the irregular surfaces of the side landing sections of the first and second support members juxtaposed to substantially overlap each other when the first and second support members are placed in mating relationship around the array of optical fibers, wherein each support member is made by:

making an array of V-grooves and side landings in monocrystalline material by photolithographic masking and etching, wherein the side landings are provided with a substantially irregular surface by:

(a) providing a mask layer having a window opening located substantially over each side landing so as to leave only the side landings exposed; and (b) roughening the exposed side landing surfaces to obtain an irregular surface thereon;

depositing metal on the array of V-grooves and side landings;

removing the monocrystalline material; and using the deposited metal as a mold portion for making the support member by molding.

6. The connector of claim 5 wherein the exposed side landing surfaces are roughened to obtain an irregular surface thereon by isotropic etching.

7. The connector of claim 5 wherein the exposed side landing surfaces are roughened to obtain an irregular surface thereon by a sandblasting operation.

8. A connector for supporting therebetween a two-dimensional array of optical fibers, comprising:

first and second outer support members each having on a first surface thereof a parallel array of grooves and at least one side landing section, the side landing section being substantially planar and having a substantially irregular surface thereon, wherein the support members are substantially entirely of plastic and are made by plastic molding;

an inner support member having on each of a first and second opposing surfaces thereof a parallel array of grooves and at least one side landing section, the side landing sections being substantially planar and having a substantially irregular surface thereon;

the grooves of the first outer support member and the first surface of the inner support member adapted to contain therebetween a first array of optical fibers, and the grooves of the second outer support member and the second surface of the inner support member adapted to contain therebetween a second array of optical fibers;

the irregular surfaces of the side landing sections of the first and second outer support members juxtaposed to substantially overlap mating irregular surfaces of the inner support member when the first and second outer support members are placed in mating relationship around the inner support member and the first and second arrays of optical fibers.

9. The connector of claim 8 wherein the irregular surfaces of the side landings are joined together around the arrays of optical fibers with an adhesive epoxy.

10. A connector for supporting therebetween a two-dimensional array of optical fibers, comprising:

first and second outer support members each having on a first surface thereof a parallel array of grooves and at least one side landing section, the side landing section being substantially planar and having a substantially irregular surface thereon;

an inner support member having on each of a first and second opposing surfaces thereof a parallel array of grooves and at least one side landing section, the side landing sections being substantially planar and having a substantially irregular surface thereon;

the grooves of the first outer support members and the first surface of the inner support member adapted to contain therebetween a first array of optical fibers, and the grooves of the second outer support member and the second surface of the inner support member adapted to contain therebetween a second array of optical fibers; and the irregular surfaces of the side landing sections of the first and second outer support members juxtaposed to substantially overlap mating irregular surfaces of the inner support member when the first and second outer support members are places in mating relationship around the inner support member and the first and second arrays of optical fibers, wherein each support member is made by:

making an array of V-grooves and side landings in monocrystalline material by photolithographic masking and etching, wherein the side landings are provided with a substantially irregular surface by:

(a) providing a mask layer having a window opening located substantially over each side landing so as to leave only the side landings exposed; and (b) roughening the exposed side landing surfaces to obtain an irregular surface thereon;

depositing metal on the array of V-grooves and side landings;

removing the monocrystalline material; and using the deposited metal as a mold portion for making the support member by molding.

11. The connector of claim 10 wherein the exposed side landing surfaces are roughened to obtain an irregular surface thereon by isotropic etching.

12. The connector of claim 10 wherein the exposed side landing surfaces are roughened to obtain an irregular surface thereon by a sandblasting operation.

13. A method for applying a connector to a parallel array of optical fibers that are adhered to first and second displaced substrate portions and which extend between the displaced substrate portions; comprising the steps of:

providing first and second optical fiber support members having on opposing and mating surfaces thereof a substantially planar side landing section having a substantially irregular surface suitable for enhancing the bonding therebetween, containing the array of optical fibers between the first and second optical fiber support members on opposite sides of the array, applying fluid adhesive between the first and second support members and to the optical fibers and clamping together the first and second support members as the adhesive cures, and cutting transversely through the first and second support members and the optical fiber array; and making an array of V-grooves and side landings in monocrystalline material by photolithographic masking and etching, wherein the side landings are provided with a substantially irregular surface by:
  (a) providing a mask layer having a window opening located substantially over each side landing so as to leave only the side landings exposed; and
  (b) roughening the exposed side landing surfaces to obtain an irregular surface thereon;
depositing metal on the array of V-grooves and side landings;

removing the monocrystalline material; and
using the deposited metal as a mold portion for making the support member by molding.

14. The method of claim 13 wherein the exposed side landing surfaces are roughened to obtain an irregular surface thereon by isotropic etching.

15. The method of claim 13 wherein the exposed side landing surfaces are roughened to obtain an irregular surface thereon by a sandblasting operation.

* * * * *